United States Patent
Kondou

(10) Patent No.: US 8,364,492 B2
(45) Date of Patent: Jan. 29, 2013

(54) APPARATUS, METHOD AND PROGRAM FOR GIVING WARNING IN CONNECTION WITH INPUTTING OF UNVOICED SPEECH

(75) Inventor: Reishi Kondou, Tokyo (JP)

(73) Assignee: NEC Corporation, Tokyo (JP)

( * ) Notice: Subject to any disclaimer, the term of this patent is extended or adjusted under 35 U.S.C. 154(b) by 1048 days.

(21) Appl. No.: 12/309,241

(22) PCT Filed: Jul. 6, 2007

(86) PCT No.: PCT/JP2007/063540
§ 371 (c)(1),
(2), (4) Date: Jan. 12, 2009

(87) PCT Pub. No.: WO2008/007616
PCT Pub. Date: Jan. 17, 2008

(65) Prior Publication Data
US 2009/0254350 A1    Oct. 8, 2009

(30) Foreign Application Priority Data
Jul. 13, 2006  (JP) .................. 2006-193010

(51) Int. Cl.
G10L 11/06 (2006.01)
G10L 11/02 (2006.01)
G10L 21/00 (2006.01)
G06F 15/10 (2006.01)

(52) U.S. Cl. ................ 704/274; 704/200; 704/214

(58) Field of Classification Search .......... 704/200–214, 704/226–229, 231–257, 271–274, E15.001–E15.05, 704/E21.001–E21.02, E11.001–E11.007
See application file for complete search history.

(56) References Cited

U.S. PATENT DOCUMENTS

| 3,681,530 | A | * | 8/1972 | Manley et al. ............ 704/203 |
| 4,058,676 | A | * | 11/1977 | Wilkes et al. ............ 704/220 |
| 4,360,708 | A | * | 11/1982 | Taguchi et al. ............ 704/229 |
| 4,401,849 | A | * | 8/1983 | Ichikawa et al. ............ 704/210 |
| 4,461,024 | A | * | 7/1984 | Rengger et al. ............ 704/233 |
| 4,912,764 | A | * | 3/1990 | Hartwell et al. ............ 704/261 |
| 4,972,490 | A | * | 11/1990 | Thomson ............ 704/208 |
| 5,007,093 | A | * | 4/1991 | Thomson ............ 704/214 |
| 5,091,946 | A | * | 2/1992 | Ozawa ............ 704/208 |
| 5,119,424 | A | * | 6/1992 | Asakawa et al. ............ 704/208 |
| 5,127,053 | A | * | 6/1992 | Koch ............ 704/207 |

(Continued)

FOREIGN PATENT DOCUMENTS
WO    WO 2008007616 A1 *    1/2008

OTHER PUBLICATIONS

Furui, "Digital Signal Processing," Publishing Group of Tokai University, Sep. 25, 1985, p. 69.

(Continued)

Primary Examiner — Pierre-Louis Desir
Assistant Examiner — David Kovacek
(74) Attorney, Agent, or Firm — Foley & Lardner LLP

(57) ABSTRACT

Disclosed is an apparatus including an unvoiced speech input device, a decision unit and an alarm unit. The unvoiced speech input device receives the unvoiced speech, and the decision unit determines whether or not a signal received from the unvoiced speech input device is an ordinary speech. The alarm unit receives a result of the decision from the decision unit to give an alarm when the result of decision indicates the ordinary speech. The alarm is given to a wearer of the apparatus if he/she has made ordinary speech.

10 Claims, 16 Drawing Sheets

U.S. PATENT DOCUMENTS

| | | | | |
|---|---|---|---|---|
| 5,479,559 | A * | 12/1995 | Fette et al. | 704/207 |
| 5,611,019 | A * | 3/1997 | Nakatoh et al. | 704/233 |
| 5,640,490 | A * | 6/1997 | Hansen et al. | 704/254 |
| 5,684,926 | A * | 11/1997 | Huang et al. | 704/268 |
| 5,706,394 | A * | 1/1998 | Wynn | 704/219 |
| 5,774,837 | A * | 6/1998 | Yeldener et al. | 704/208 |
| 6,128,591 | A * | 10/2000 | Taori et al. | 704/214 |
| 6,226,606 | B1 * | 5/2001 | Acero et al. | 704/218 |
| 6,510,407 | B1 * | 1/2003 | Wang | 704/207 |
| 6,594,626 | B2 * | 7/2003 | Suzuki et al. | 704/220 |
| 6,640,208 | B1 * | 10/2003 | Zhang et al. | 704/214 |
| 6,640,209 | B1 * | 10/2003 | Das | 704/219 |
| 7,120,477 | B2 * | 10/2006 | Huang | 455/575.7 |
| 2001/0010037 | A1 * | 7/2001 | Imai et al. | 704/210 |
| 2002/0019734 | A1 * | 2/2002 | Bartosik | 704/231 |
| 2002/0055839 | A1 * | 5/2002 | Jinnai et al. | 704/240 |
| 2002/0196911 | A1 * | 12/2002 | Gao et al. | 379/88.03 |
| 2002/0198705 | A1 * | 12/2002 | Burnett | 704/214 |
| 2003/0055639 | A1 * | 3/2003 | Rees | 704/233 |
| 2003/0212547 | A1 * | 11/2003 | Engelke et al. | 704/200 |
| 2004/0260547 | A1 * | 12/2004 | Cohen et al. | 704/233 |
| 2005/0055204 | A1 * | 3/2005 | Florencio et al. | 704/233 |
| 2005/0119894 | A1 * | 6/2005 | Cutler et al. | 704/270 |
| 2005/0177364 | A1 * | 8/2005 | Jelinek | 704/214 |
| 2005/0185813 | A1 * | 8/2005 | Sinclair et al. | 381/380 |
| 2005/0244020 | A1 * | 11/2005 | Nakajima et al. | 381/151 |
| 2006/0293887 | A1 * | 12/2006 | Zhang et al. | 704/233 |
| 2007/0100626 | A1 * | 5/2007 | Miller et al. | 704/258 |
| 2007/0198268 | A1 * | 8/2007 | Hennecke | 704/270 |
| 2007/0291953 | A1 * | 12/2007 | Ngia et al. | 381/71.6 |
| 2009/0254350 | A1 * | 10/2009 | Kondou | 704/274 |
| 2009/0326952 | A1 * | 12/2009 | Toda et al. | 704/270 |

OTHER PUBLICATIONS

Nakajima et al., "Recognition of Non-Voiced Speech by Extraction of Weak Body Transmitted Sound," theses for lecture delivered in Meeting of Japan Society of Acoustics, Mar. 2003, 3-Q-12, pp. 175-176.

* cited by examiner

FIG.14

|  | $Pth1 < Pn$ | $Pth1 \geq Pn$ |
|---|---|---|
| $Pth2 < Pm$ | ORDINARY SPEECH | EXTERNAL NOISE |
| $Pth2 \geq Pm$ | NAM SPEECH OR UNVOICED SPEECH | UNVOICED |

APPARATUS, METHOD AND PROGRAM FOR GIVING WARNING IN CONNECTION WITH INPUTTING OF UNVOICED SPEECH

TECHNICAL FIELD (Related application) This application claims the benefit of Japanese Patent Application No. 2006-193010, filed Jul. 13, 2006, which is hereby incorporated by reference herein in its entirety.

This invention relates to an apparatus, a method and a program for giving alarm in connection with inputting of unvoiced speech.

BACKGROUND ART

There has been proposed an apparatus for inputting a speech signal uttered in a manner inaudible to a third party.

In Non-Patent Document 1, for example, there is disclosed a NAM (Non-Audible Murmur) microphone, a device designed to receive a non-audible murmur. This NAM microphone is able to receive not only NAM but also an ordinary speech transmitted within a body, also termed 'BTOS' (body-transmitted ordinary speech).

In Patent Document 1, for example, there is disclosed a technique in which features of a spectral envelop of an unvoiced speech, input to an unvoiced speech input unit, are extracted, and the unvoiced speech is converted with the aid of the so extracted features (the unvoiced speech may be converted to an ordinary speech or an ordinary speech exhibiting the characteristic of another person). In Patent Document 2, there is disclosed a technique in which a NAM signal, received by a NAM microphone, is recognized as speech and a candidate for recognition is output by speech synthesis and checked. In Patent Document 3, there is disclosed a technique in which there are provided a first microphone for collecting an audible speech signal, a second microphone for collecting a non-audible speech signal (NAM) and a memory for holding signals received from the first and second microphones. The signal received from the second microphone is subjected to speech recognition, based on an acoustic model constructed by the non-audible sound, and the text, obtained by the speech recognition, is converted to a synthesized speech which is deemed to be an ordinary speech and recorded. In Patent Document 4, there is disclosed a configuration in which an interval where the audible sound exists and an interval where the non-audible sound exists are separately represented based on the signals delivered from the first and second microphones. In Patent Document 4, there is disclosed a technique in which the speech from a NAM microphone is recognized as speech and a microphone wearing location is guided to an optimum location based on e.g. a recognition model.

Patent Document 1

JP Patent Kokai Publication No. JP2005-173476A

Patent Document 2

JP Patent Kokai Publication No. JP2005-33568A

Patent Document 3

JP Patent Kokai Publication No. JP2005-140858A

Patent Document 4

JP Patent Kokai Publication No. JP2005-140860A

Non-Patent Document 1

Nakajima et al., 'Recognition of Non-Voiced Speech by Extraction of Weak Body Transmitted Sound', theses for lectures delivered in Meeting of Japan Society of Acoustics, March 2003, 3-Q-12, pp. 175-176

Non-Patent Document 2

Furui, 'Digital Signal Processing', Publishing Group of Tokai University

SUMMARY OF THE INVENTION

The total disclosures of the Patent Documents 1 to 4 and the Non-Patent Documents 1 and 2 are incorporated herein by reference. The analysis below described is given by the present invention.

It is noted that when a person who wears a NAM microphone uses the NAM microphone, he/she has to be conscious of whether he/she is to utter NAM or utter an ordinarily speech.

It may thus frequently occur that a person who utters (a person who wears a NAM microphone) utters an ordinary speech by error in a situation he/she has to utter NAM. In such case, it may be desirable to implement means for immediately advising the person who utters that it is a NAM speech that he/she is to utter.

The reason is that, if the person who utters continues to utter an ordinary speech even though the situation is such that the NAM speech is to be uttered, the uttered contents may be heard by a third party, which may give rise to unforeseen inconveniences.

It is therefore an object of the present invention to provide an apparatus, a method and a program capable of making distinction as to whether an utterance from a wearer of the apparatus for inputting an unvoiced speech, such as NAM, is actually an ordinary speech, and which may guide the wearer to utter a speech as intended.

To solve one or more of the above problems, the invention disclosed in the present application may substantially be summarized as follows:

In one aspect of the present invention, there is provided a system comprising an input unit that inputs at least a signal of unvoiced speech, an analysis unit that analyzes a characteristic of an input signal, supplied to the input unit, and a decision unit that determines whether or not the result of analysis of the analysis unit has a characteristic equivalent to a characteristic of an ordinary speech to give a decision as to whether or not an ordinary speech has been input.

According to the present invention, the analysis unit analyzes the signal received by the input unit, from interval to interval. In case a characteristic corresponding to the ordinary speech persists in succession for a predetermined number of intervals, the decision means decides that the incoming utterance is not an unvoiced speech but an ordinary speech.

According to the present invention, there is provided an alarm unit that outputs an alarm in case the result of decision indicates an ordinary speech.

In another aspect of the present invention, there is provided an apparatus comprising an unvoiced speech input device that inputs speech utterance, a decision unit that determines whether or not the signal received from the unvoiced speech input device is an ordinary speech, and an alarm unit that receives a result of decision from the decision unit to output an alarm in case the result of decision indicates an ordinary speech.

According to the present invention, the decision unit determines that the incoming utterance is different from the ordinary speech in case the power of the input signal is less than or equal to a preset threshold value.

According to the present invention, the decision unit calculates the maximum value of the autocorrelation function of the input signal and determines the input signal to be other than the ordinary speech in case the maximum value is less than or equal to a preset value.

According to the present invention, there is provided an ordinary speech input device that inputs the ordinary speech. The decision unit determines whether or not the signal received from the unvoiced speech input device is the ordinary speech, using the signal received from the unvoiced speech input device and the signal delivered from the ordinary speech input device.

According to the present invention, the unvoiced speech input device is a microphone for unvoiced speech.

According to the present invention, the ordinary speech input device is an ordinary microphone that receives the speech propagated in air.

According to the present invention, the decision unit gives a decision that an ordinary speech is input in case the maximum value of the cross correlation function of a signal received from the unvoiced speech input device and a signal received from the ordinary speech input device is greater than or equal to a predetermined value.

According to the present invention, the decision unit gives a decision that an ordinary speech is input in case the pitch frequency of a signal received from the unvoiced speech input device is coincident with the pitch frequency of a signal received from the ordinary speech input device.

According to the present invention, the decision unit may determine the signal received from the unvoiced speech input device to be other than the ordinary speech, in case the power of the signal received from the unvoiced speech input device is less than or equal to a preset threshold value. In case the power of the signal received from the unvoiced speech input device is greater than a preset threshold value, the decision unit may determine the signal received from the unvoiced speech input device to be other than the ordinary speech, when the power of the signal received from the unvoiced speech input device is less than or equal to a preset threshold value. When the power of the signal received from the unvoiced speech input device is greater than a preset threshold value, the decision unit may calculate the maximum value of the autocorrelation function of the signal received from the unvoiced speech input device. In case the maximum value of the autocorrelation function is less than or equal to a preset threshold value, the decision unit may determine the signal received from the unvoiced speech input device to be other than the ordinary speech. In case the maximum value of the autocorrelation function is greater than or equal to a preset value, the decision unit may calculate the cross correlation function of the signal received from the unvoiced speech input device and the signal received from the ordinary speech input device. In case the maximum value of the cross correlation function is greater than or equal to a preset value, the decision unit may determine the signal received from the unvoiced speech input device to be the ordinary speech. The decision unit may determine the signal received from the unvoiced speech input device to be other than the ordinary speech in case the maximum value of the cross correlation function is less than a preset value.

In the apparatus according to the present invention, there may be provided a speech converter that converts a signal received from the unvoiced speech input device to an ordinary speech and an output device that outputs the ordinary speech converted by the speech converter. The signal received from the unvoiced speech input device may be converted by the speech converter to the ordinary speech and fed back to a wearer via the output device. The alarm unit may give an alarm via the output device to the wearer in case the signal received from the unvoiced speech input device has been determined to be the ordinary speech. According to the present invention, the output device may be a headphone.

In the apparatus according to the present invention, there may further be provided a suppression unit between the speech converter and the output device for suppressing the feedback from the speech converter to the wearer. The feedback of the ordinary speech from the speech converter to the output device may be suppressed when an alarm is given from the output device by the alarm unit.

In the apparatus according to the present invention, there may further be provided a power calculating unit for calculating the power of a signal received from the unvoiced speech input device calculating unit. The power calculating unit gives a decision that a frame of the input speech in question is ordinary speech in case the power value as found by the power calculating unit is greater than a preset threshold value.

In the apparatus according to the present invention, there may further be provided a power calculating unit for calculating the power of a signal received from the unvoiced speech input device calculating unit. An output of the power calculating unit may be supplied to the decision unit. There may also be provided a first power holding unit connected to the power calculating unit via a first switch turned on when no speech is generated. The first power holding unit may hold the power output from the power calculating unit. There may also be provided a second power holding unit connected to the power calculating unit via a second switch turned on when an ordinary speech is generated. The second power holding unit may hold the power output from the power calculating unit. There may also be provided a threshold value calculating unit for deriving a threshold value from the power values held by the first and second power holding units. The threshold value derived by the threshold value calculating unit may be supplied to the decision unit. The decision unit may compare an output of the power calculating unit with the threshold value derived by the threshold value calculating unit to determine whether or not the signal received from the unvoiced speech input device calculating unit is ordinary speech.

In the apparatus according to the present invention, the first and second power holding units may each hold a sequence of first and second power values for a plurality of time intervals during the time the first and second switches are on. The threshold value calculating unit may find a threshold value by maximum likelihood estimation with respect to the occurrence frequency of the unvoiced speech and to the occurrence frequency of the ordinary speech for the first and second power value sequences held by the first and second power holding units.

In the apparatus according to the present invention, there may further be provided a power calculating unit that calculates a power of a signal received from the unvoiced speech input device. An output of the power calculating unit may be supplied to the decision unit. There may also be provided a power holding unit that holds a sequence of the power output from the power calculating unit, and a threshold value calculating unit that derives a threshold value from a power sequence held by the power holding unit. The threshold value derived from the threshold value calculating unit may be supplied to the decision unit. The decision unit may compare an output of the power calculating unit with the threshold value derived from the threshold value calculating unit to determine whether or not the signal is an ordinary speech. The threshold value calculating unit may calculate the occurrence frequency of the power held by the power holding unit and calculate the value of the power that assumes a minimum value between the maximum peak and a second peak of the occurrence frequency as being a threshold value.

In the apparatus according to the present invention, there may further be provided an autocorrelation calculating unit that calculates the value of an autocorrelation function of a signal received from the unvoiced speech input device. The decision unit may give decision that a frame of the input speech in question is the ordinary speech in case the value of the autocorrelation function as found by the autocorrelation calculating unit is greater than a predetermined threshold value.

In the present invention, the decision unit may verify the input signal as being the ordinary speech in case of consecutive occurrence of a number greater than a preset number of frames in which the maximum values of the autocorrelation function as found by the autocorrelation calculating unit are larger than a preset threshold value.

In the present invention, the decision unit may verify the input signal as being the ordinary speech in case of consecutive occurrence of a number greater than a preset number of frames in which the values of the ratio between the maximum values and the minimum values of the autocorrelation function as found by the autocorrelation calculating unit are larger than a preset threshold value.

In the apparatus according to the present invention, there may further be provided an autocorrelation calculating unit that calculates the values of the autocorrelation function of the signal received from the unvoiced speech input device, a voiced speech decision unit for determining whether or not the signal is voiced from an output of the autocorrelation calculating unit, and a pitch frequency calculating unit for calculating the pitch frequency of the signal received from the unvoiced speech input device. The decision unit may receive an output of the voiced speech decision unit and an output of the pitch frequency calculating unit to determine whether or not the signal is the ordinary speech.

In the present invention, the voiced speech decision unit may verify, in case of consecutive occurrence of a number greater than a preset number of frames in which the maximum values of the autocorrelation function are not less than a preset value, that corresponding intervals are voiced intervals. The decision unit may verify the interval, determined by the voiced speech decision unit to be a voiced interval and having a pitch frequency within a preset frequency range, as being the ordinary speech.

In the apparatus according to the present invention, there may further be provided a first power calculating unit that calculates a power of a signal received from the unvoiced speech input device, and a second power calculating unit that calculates a power of a signal received from the ordinary speech input device. The decision unit may receive outputs of the first and second power calculating units and determine whether or not the signal is the ordinary speech based on a threshold value.

In the present invention, the decision unit may verify that the incoming utterance is the ordinary speech in case the output of the first power calculating unit is greater than a first threshold value and the output of the second power calculating unit is greater than a second threshold value.

In the apparatus according to the present invention, there may further be provided a cross correlation calculating unit that calculates a cross correlation function of a signal received from the unvoiced speech input device and a signal received from the ordinary speech input device. The decision unit may determine whether or not the signal is the ordinary speech based on an output value of the cross correlation calculating unit and a preset threshold value.

In the apparatus according to the present invention, there may further be provided a sensor for detecting vibration or the acceleration. An output of the sensor may be supplied to the decision unit, which decision unit may exercise control so as not to make a decision for an ordinary speech in case the sensor has detected the vibration or acceleration.

In a further aspect of the present invention, there is provided a method comprising the steps of analyzing a characteristic of a signal received from a device that inputs at least the unvoiced speech, determining whether or not an analyzed result is of the characteristic equivalent to that of ordinary speech to determine whether or not the incoming utterance is ordinary speech, and outputting an alarm in case the result of decision indicates an ordinary speech.

In the method according to the present invention, an input signal is determined to be other than the ordinary speech in case the power of the input signal is less than or equal to a predetermined threshold value.

In the method according to the present invention, the maximum value of the autocorrelation function of the input signal is calculated and, if the power of the input signal is less than or equal to a predetermined value, the input signal is determined to be other than the ordinary speech.

In the method according to the present invention, the signal received from the unvoiced speech input device and the signal received from the ordinary speech input device are used to determine whether or not the former signal is the ordinary speech. According to the present invention, when the power of the signal received from the unvoiced speech input device is less than or equal to a predetermined threshold value, the signal is determined to be other than the ordinary speech. When the power of the signal received from the unvoiced speech input device is greater than the predetermined threshold value, the signal is determined to be other than the ordinary speech in case the power of a signal received from an ordinary speech input device is less than or equal to the predetermined threshold value. In case the power of the signal received from the ordinary speech input device is greater than the predetermined threshold value, the maximum value of the autocorrelation function of the signal received from the unvoiced speech input device may be calculated. If the maximum value of the autocorrelation function is greater than the predetermined threshold value, the maximum value of the cross correlation function of the signal received from the unvoiced speech input device and the signal received from the ordinary speech input device may be found. If the maximum value of the cross correlation function is greater than or equal to a predetermined value, the signal received from the unvoiced speech input device may be determined to be an ordinary speech. If the maximum value is lesser than the predetermined value, the signal received from the unvoiced speech input device may be determined to be other than the ordinary speech.

In another aspect of the present invention, there is provided a program that causes a computer of an unvoiced speech input device to execute a processing of analyzing a characteristic of a signal received from the unvoiced speech input device, a processing of determining whether or not an analyzed result indicates the characteristic equivalent to that of an ordinary speech to determine whether or not an ordinary speech has been input, and a processing of giving an alarm when the result of decision indicates an ordinary speech.

If, in the program of the present invention, the power of the input signal is less than or equal to a predetermined threshold value, the processing for decision decides that the input signal is other than the ordinary speech utterance.

In the program of the present invention, the processing for decision calculates the maximum value of the autocorrelation function. If the maximum value thus calculated is less than or equal to a predetermined value, the input signal is determined to be other than the ordinary speech utterance.

In the program according to the present invention, the signal received from the unvoiced speech input device and the signal from the ordinary speech input device are used to determine whether the former signal is the ordinary speech utterance.

According to the present invention, it is verified whether the input signal from the unvoiced speech input device is the ordinary speech utterance or NAM utterance. In the former case, an alarm is given the wearer so that the wearer may be able to continue his/her intended utterance (unvoiced speech) in stability.

According to the present invention, it is possible to give more reliable decision by using an ordinary microphone in addition to the unvoiced speech input device.

According to the present invention, it is also possible to convert an input signal from the unvoiced speech input device into an ordinary speech which is fed back at all times. In case the input is an ordinary speech utterance, an alarm may be superimposed on or scrammed into the feedback speech to advise the wearer about what is ongoing to allow the wearer to continue unvoiced speech in stability.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 14 is a tabulated diagram for illustrating the Example 11 of the present invention.

PREFERRED MODES FOR CARRYING OUT THE INVENTION

Figure 1:
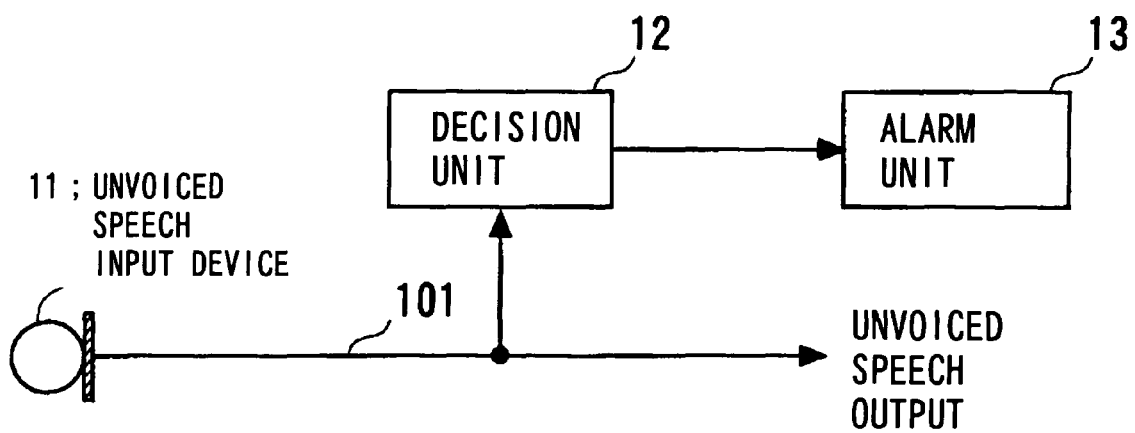
FIG. 1 is a block diagram showing the configuration of an Example 1 of the present invention.

The present invention will now be described in further detail with reference to the drawings. In an exemplary embodiment of the present invention, there are provided an unvoiced speech input device (11) for inputting an unvoiced speech, a decision unit (12) that determines whether or not an input signal from the unvoiced speech input device is an ordinary speech utterance, and an alarm unit (13) The alarm unit (13) receives the result of decision of the decision unit (12) and gives an alarm in case the result of decision indicates an ordinary speech utterance.

An ordinary microphone (14 of FIG. 2) may also be provided in addition to the arrangement of the preferred exemplary embodiment.

In a further exemplary embodiment of the present invention, there is provided a speech converter (15 of FIG. 4) for converting a signal from the unvoiced speech input device, an output device (16 of FIG. 4) that receives a speech output of the speech converter or an output of the alarm unit (13), a suppression unit (17 of FIG. 4) for suppressing the speech output from the speech converter. Examples of the present invention will now be described.

EXAMPLES

FIG. 1 is a block diagram of Example 1 of the present invention. The present Example, shown in FIG. 1, includes an unvoiced speech input device 11, a decision unit 12 and an alarm unit 13.

The unvoiced speech input device 11 is aimed to receive unvoiced speech. However, it may also receive a signal other than the unvoiced speech.

As the unvoiced speech input device 11, a NAM microphone is preferably employed. It is also possible to use a device capable of receiving the unvoiced speech, such as a throat microphone or a close-talking microphone, in place of the NAM microphone.

A signal received by the unvoiced speech input device 11 (speech band signal 101) is supplied to the decision unit 12. The signal (speech band signal) 101 is output as an unvoiced uttered speech.

The decision unit 12 sequentially processes the input signal 101 and determines whether or not the input speech is an ordinary speech utterance, using at least one of presence or non-presence of the periodicity of the waveform, an auto-correlation coefficient of the waveform, and an average power of the waveform. It is possible to determine at this time whether the input speech is the ordinary speech utterance, unvoiced speech or the other signal.

It is noted that

'unvoiced speech' is the speech uttered by a speaker so that it is scarcely recognized by a third party;

'ordinary speech utterance' is the utterance, other than the unvoiced speech, of the human being; and 'the other signals' mean signals not uttered by the human being, such as noises or heart sound.

When the decision unit 12 has determined that the input speech is the ordinary speech utterance, it sends the result of decision to the alarm unit 13. When the alarm unit 13 has received the result of decision that the input speech is the ordinary speech utterance, it delivers an alarm output to the effect that 'ordinary speech is being uttered'.

It is to be noted that, in the present Example, the decision by the decision unit 12 is not limited to an ordinary speech utterance, an unvoiced speech, or to other signals. It is only sufficient that the ordinary speech may be discriminated from other signals (signals other than the ordinary speech).

In the present Example, a buzzer may be used as the alarm unit 13, though no limitation is imposed on the present invention. Alternatively, an acoustic device, such as headphone or loudspeaker, a vibrating device, such as a vibrator, an optical device, such as an LED (light emitting diode) or LCD (liquid crystal display device), a visual transmission device, such as raising a flag, or an electrical signal to outside the system, may also be used.

In the present Example, the operations in the alarm unit 13 are not limited to those described above. For example, it is also possible to determine the ordinary speech, based on the magnitude of recognition likelihood, with the use of a speech recognition device provided with acoustic models for an unvoiced speech utterance, ordinary speech utterance and other signal.

In the present Example, it is of course possible to have the processing functions of the decision unit 12 implemented by a program as run by a computer. Or, it is possible for the decision unit 12 to control the hardware circuitry of, for example, the alarm unit 13, such as a buzzer, a headphone, loudspeaker or an LCD. In this case, the decision unit 12 and the alarm unit 13 are mounted as a software control system. If the signal 101 from the unvoiced speech input device 11 is an analog signal, the signal 101 is converted to a digital signal by an A/D converter, not shown, provided in the decision unit 12. Then, by digital signal processing by a CPU (Central Processing Unit) or a DSP (Digital Signal Processor), not shown, signal characteristics, such as periodicity, autocorrelation or signal powers, are found for use in carrying out the processing for decision.

Figure 2:
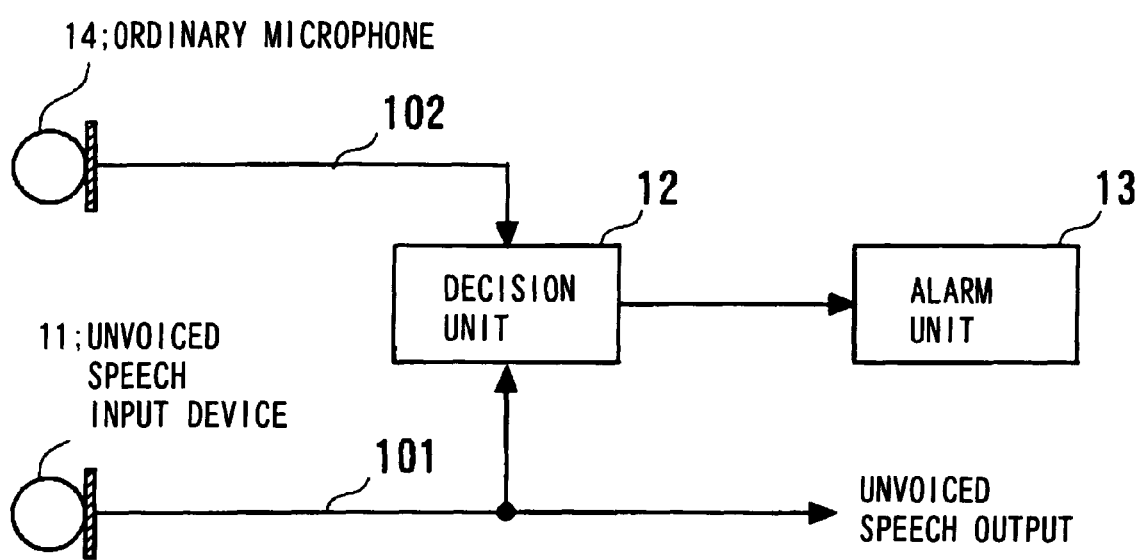
FIG. 2 is a block diagram showing the configuration of an Example 2 of the present invention.

Example 2 of the present invention will now be described. FIG. 2 shows the configuration of the Example 2. The present Example includes, in addition to the components provided in Example 1, an ordinary microphone 14 that constitutes an ordinary speech input device in the present invention.

In distinction from the unvoiced speech input device 11, the ordinary microphone 14 is a microphone that receives only the speech propagated in air. The ordinary microphone 14 is usually mounted in the vicinity of a user's lip, and is preferably a hands-free microphone. A speech signal 102, received from the ordinary microphone 14, is supplied to the decision unit 12.

The decision unit 12 receives the signal 101 input from the unvoiced speech input device 11, and the signal 102 input from the ordinary microphone 14, compares the two signals and determines whether the signal 101 is a signal of ordinary speech utterance or other than the ordinary speech utterance.

Figure 3:
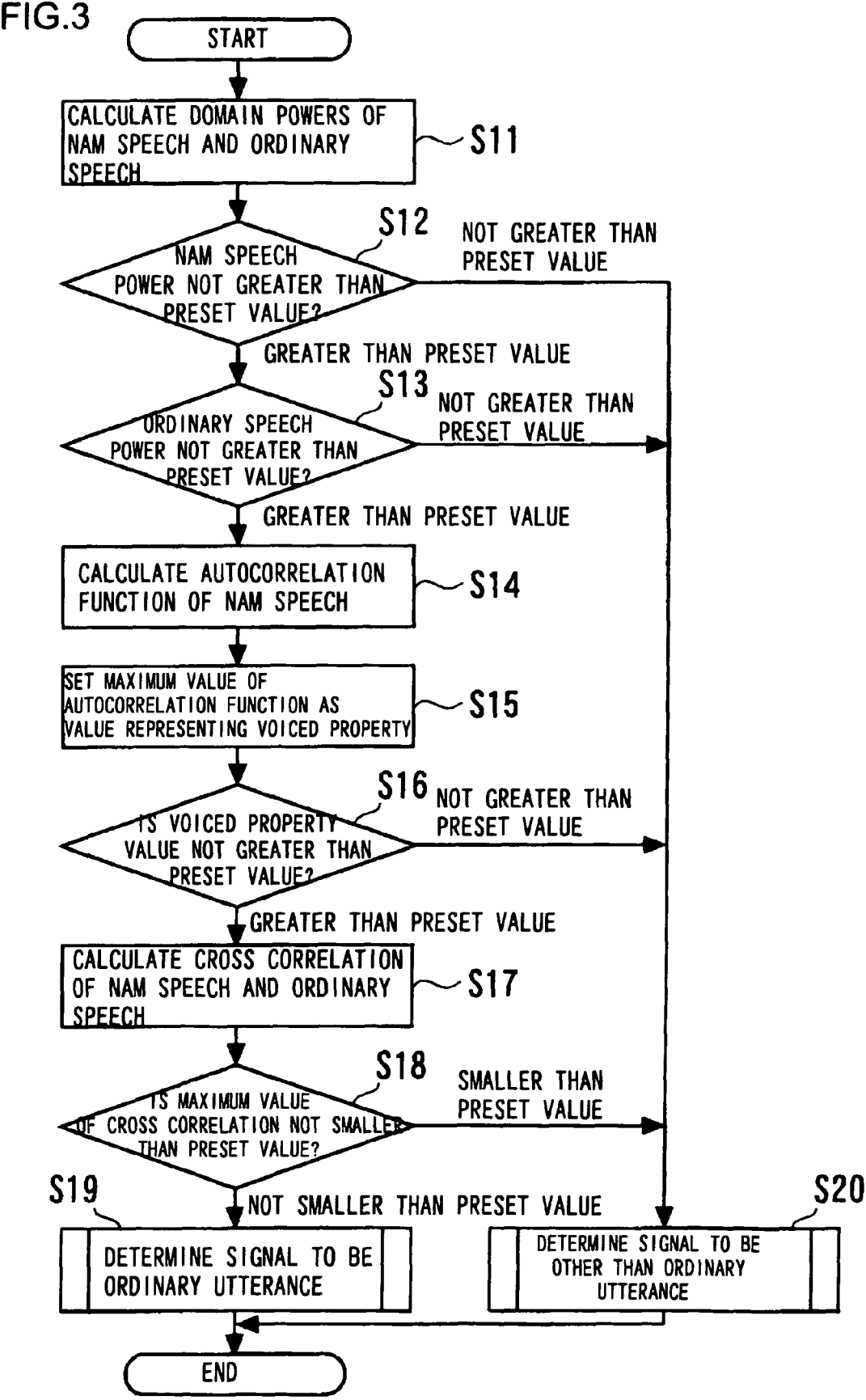
FIG. 3 is a flowchart showing an operational flow of a decision unit in the Example 1 of the present invention.

In the present Example, the signals 101 and 102 at the same time point, are extracted every constant time interval (on the frame basis), by the decision unit 12, and processing for decision is carried out in accordance with an algorithm of the flowchart shown in FIG. 3. The contents of the algorithm of FIG. 3 are now described.

Initially, the average interval powers of the first and second signals 101 and 102 in a given time interval are calculated (step S11). If the average interval powers of the two signals are not higher than a predetermined value (threshold value), the interval are unvoiced intervals. The signal is thus determined to be other than the ordinary speech utterance (step S20). That is, the speech power of the signal 101 is checked in a step S12 as to whether or not it is lower than or equal to a preset threshold value (first threshold value). If it is lower than or equal to the threshold value, branching to the step S20 is executed. It is then checked in a step S13 as to whether or not the interval power of the signal 102 is lower than or equal to a preset threshold value (second threshold value). If it is lower than or equal to the second threshold value, branching to the step S20 is executed (the signal is determined to be other than the ordinary speech utterance).

If the average interval powers of the signals 101 and 102 are equal to or higher than the respective preset threshold values, the autocorrelation function of the NAM speech is calculated in a step S14, and the maximum value of the autocorrelation function is set as a value of voiced property (step S15). That is, the periodicity of the signal 101 is calculated.

If the result of check of the step S16 indicates that the periodicity of the signal 101 is lower than a preset threshold value (third threshold value), branching to the step S20 is executed (the signal is determined to be other than the ordinary speech utterance). The reason is that the speech is unvoiced and no distinction may be made between the unvoiced speech and the ordinary speech utterance. If conversely the result of check of the step S16 indicates that the value of voiced property is higher than the threshold value, the program advances to a step S17 to calculate the value of the cross correlation function of the signals 101 and 102.

It is checked in a step S18 whether or not the maximum value of the cross correlation function is greater than a preset threshold value (fourth threshold value). The interval in question is determined to be an interval of ordinary speech utterance, only when the maximum value of the cross correlation function that is greater than the preset threshold value (step S19).

The interval in question is determined to be the ordinary speech when the average interval power of the NAM speech is greater than the corresponding threshold value (first threshold value), the average interval power of the ordinary speech is greater than the corresponding threshold value (second threshold value), the value of autocorrelation of the NAM speech is greater than the corresponding threshold value (third threshold value) and the value of the cross correlation is greater than the corresponding threshold value (third threshold value).

In the present Example, the cross correlation functions of the signals 101 and 102 are calculated to determine whether or not a speech in question is the ordinary speech utterance. It is thus possible to reduce the effect of e.g. the noise generated due to body movements, thus assuring more reliable decision.

Figure 4:
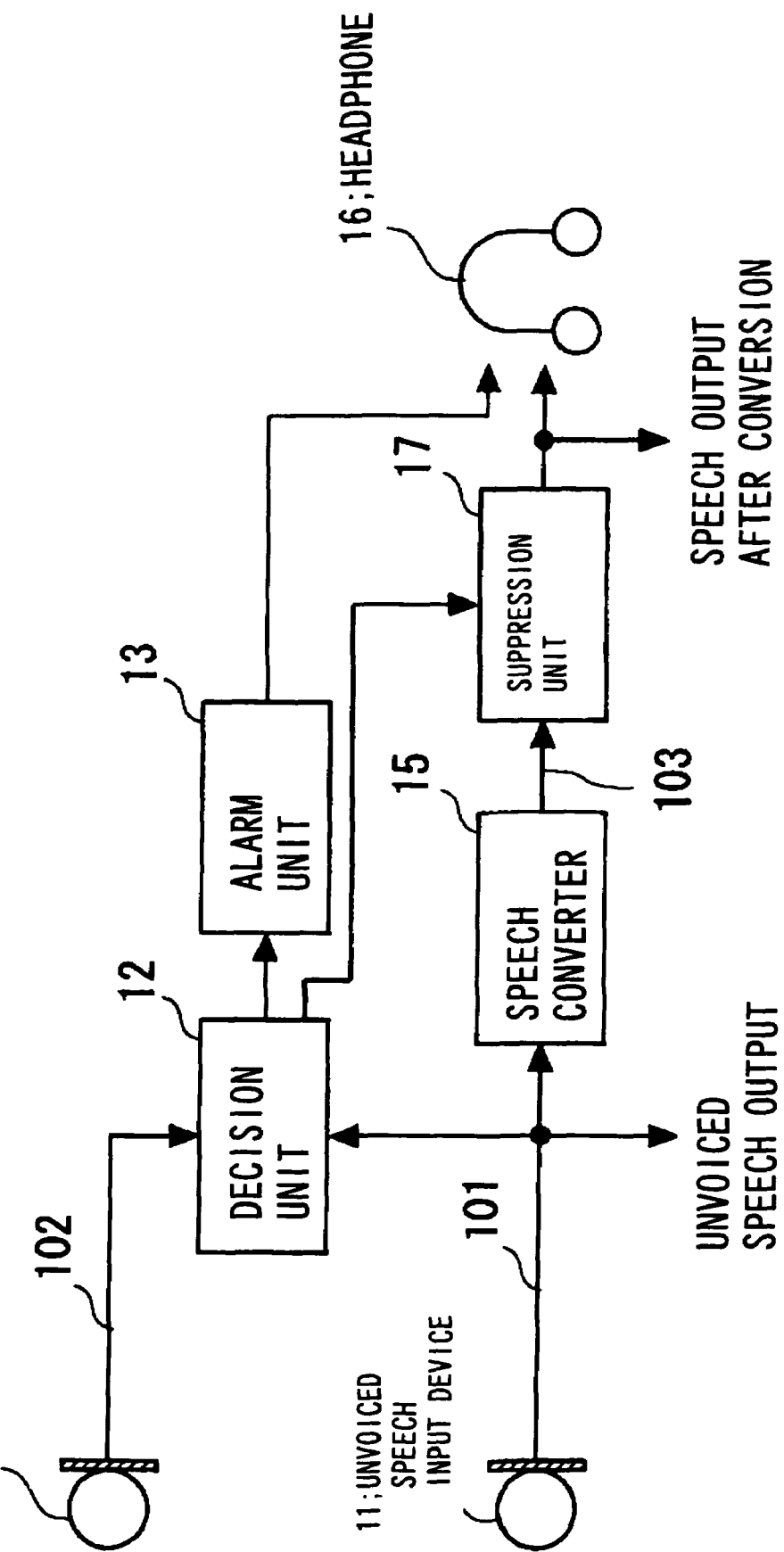
FIG. 4 is a block diagram showing the configuration of an Example 3 of the present invention.

An Example 3 of the present invention will now be described. FIG. 4 shows the configuration of the present Example 3. The present Example includes a speech converter

15, a headphone 16 and a suppression unit 17, in addition to the components of the Example 2.

The speech converter 15 converts the signal 101 from the unvoiced speech input device 11 to ordinary speech by using, for example, the technique described in Patent Document 1.

A signal 103, converted to the ordinary speech utterance by the speech converter 15, is directly fed back to the wearer by the headphone 16. That is, the wearer may hear the speech he/she has uttered. This feedback may assist the wearer to utter his/her speech in stability even in noisy sound environments.

When the decision unit 12 has verified the signal 101 to be the ordinary speech utterance, the alarm unit 13 generates an alarm sound signal and outputs it to the headphone 16, at the same time as the suppression unit 17 suppresses the outputting of the speech converter 15. The wearer may then hear the alarm sound from the same headphone 16 as that from which he/she hears the feedback at all times. The wearer may thus recognize that he/she has committed an act of making an ordinary speech utterance without this being surmised by near-by persons. In this manner, the wearer may easily halt ordinary speech utterance to promptly proceed to unvoiced speech.

The suppression unit 17 may be a switch that simply mutes a signal to provide no sound or may be a means to lower the sound volume.

The alarm sound signal, generated by the alarm unit 13, may be a beep, siren or a pre-recorded annunciation to the effect that an ordinary speech is being uttered.

The headphone 16 may be not only an ordinary acoustic headphone but also a single-ear earphone or a bone-transmitted headphone.

If the NAM microphone is used as the unvoiced speech input device 11 and the acoustic headphone is used as the headphone 16, wasteful acoustic coupling is not liable to be produced because the two microphones are differ in type from each other.

The unvoiced speech input device 11 and the headphone 16 may be worn as an integral unit. Or, a sole device may be bidirectionally used for use in common. In the present Example, the processing and the functions of the speech converter 15, suppression unit 17, decision unit 12 and the alarm unit 13 may be implemented by a program which may be run on a computer (CPU).

The foregoing is description of the present Example. The technique that detects the ordinary speech from the signal received from the unvoiced speech input device 11 is not limited to the above technique and several other techniques may also be used, as hereinafter explained.

Figure 5:
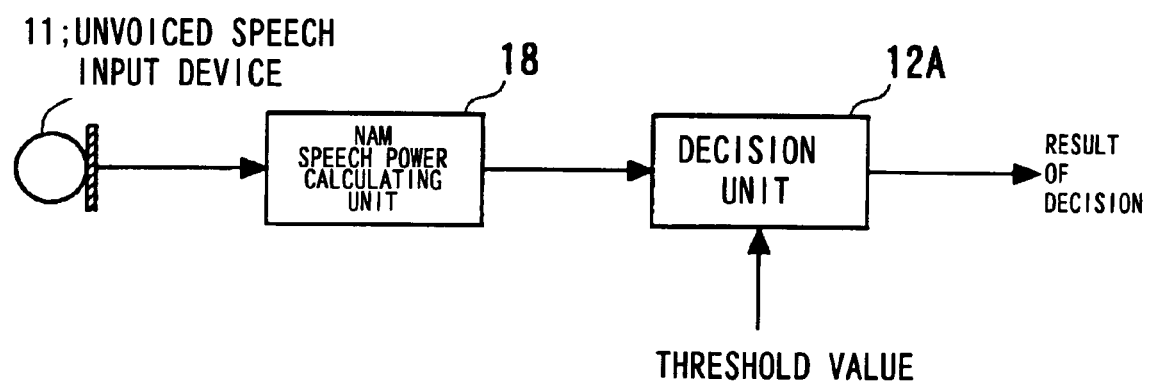
FIG. 5 is a block diagram showing the configuration of an Example 4 of the present invention.

An Example 4 of the present invention will now be described. FIG. 5 shows the configuration of Example 4 of the present invention. Referring to FIG. 5, the present Example includes an unvoiced speech input device 11, a NAM speech power calculating unit 18 and a decision unit 12A. In the present Example, the decision unit 12 of FIG. 1 is made up by the NAM speech power calculating unit 18 and the decision unit 12A.

The unvoiced speech input device 11 is made up of, for example, a microphone, and receives the speech. The NAM speech power calculating unit 18 calculates a short-term rms (root mean square) power (effective value of power) of the speech delivered from the unvoiced speech input device 11. In calculating this rms power, it is assumed that
the frame length for analysis is 200 msec; and
there is no frame overlap.

With the sampling frequency of 16 kHz, analysis is made every 3200 samples. A Hanning window is applied to a frame of interest and the rms power is calculated.

If the short-term rms power of the frame of interest is greater than a preset threshold value, the decision unit 12 determines the frame of the input speech of interest to be an ordinary speech utterance. This is an indication that the user is uttering an ordinary speech because the power of the ordinary speech is higher than that of the NAM utterance. In the present Example, the processing and the function of the NAM speech power calculating unit 18 and the decision unit 12 may be implemented by a program executed on the computer (CPU).

Figure 6:
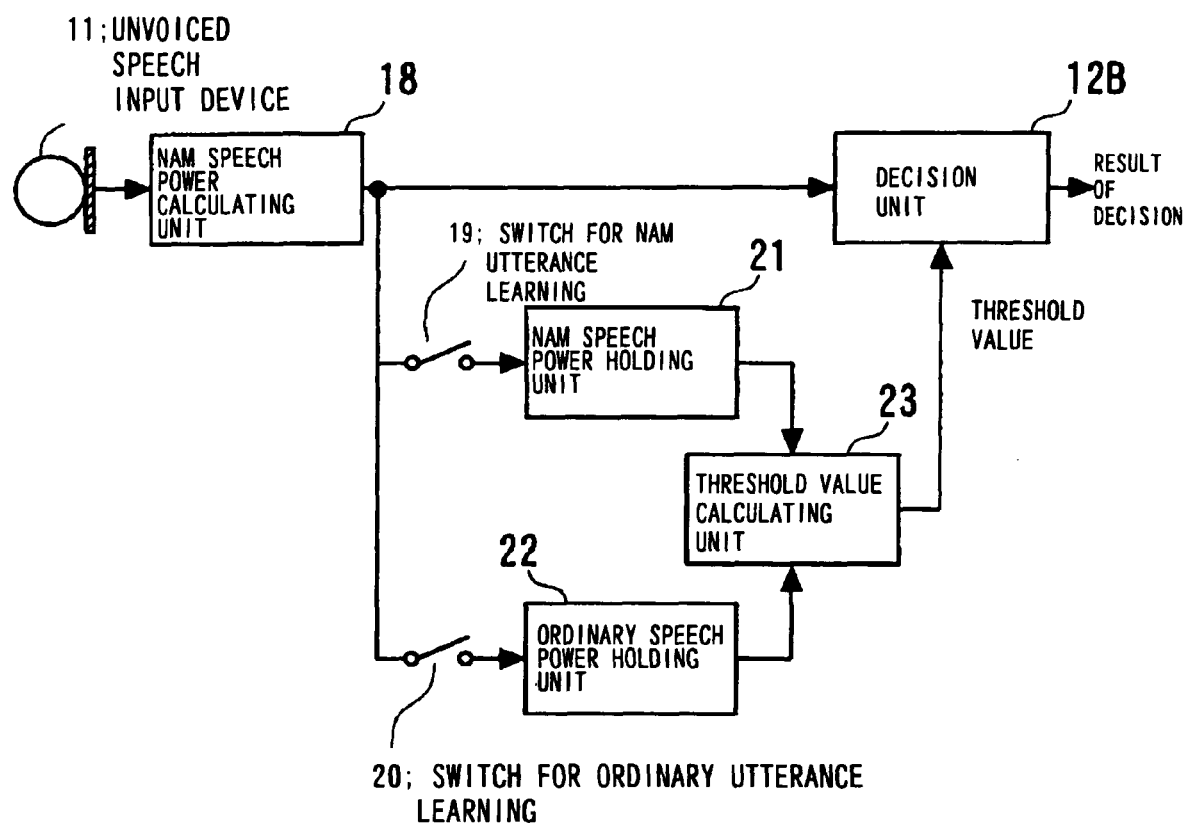
FIG. 6 is a block diagram showing the configuration of an Example 5 of the present invention.

An Example 5 of the present invention will now be described. FIG. 6 shows the configuration of the Example 5 of the present invention. Referring to FIG. 6, the present Example includes an unvoiced speech input device 11, a NAM speech power calculating unit 18, a switch for NAM utterance learning 19, a switch for ordinary speech learning 20, a NAM speech power holding unit 21, an ordinary speech power holding unit 22, a threshold value calculating unit 23, and a decision unit 12B. When the switch for NAM utterance learning 19 is on, the NAM speech power holding unit 21 receives and holds the value of the short-term rms power output from the NAM speech power calculating unit 18.

On the other hand, when the switch for ordinary speech utterance learning 20 is on, the ordinary speech power holding unit 22 receives and holds the short-term rms power output from the NAM speech power calculating unit 18.

The switch for NAM utterance learning 19 as well as the switch for ordinary speech utterance learning 20 may be formed by a button or switch, turned on by a pressing-down operation, though not in a limiting meaning. The switches 19 and 20 may be toggle switches which toggled on and off by a press-down operation.

The threshold value calculating unit 23 finds a threshold value Pth, from the short-term rms power Pn of the NAM utterance, held by the NAM speech power holding unit 21, and from the short-term rms power Pt of the ordinary speech utterance, held by the ordinary speech power holding unit 22, in accordance with the following equation (1):

$$Pth=(Pn+Pt)/2 \qquad (1)$$

By deriving the threshold value Pth as described above, the user may learn the typical powers of the NAM utterance and the ordinary speech utterance, prior to using the present Example, thereby improving the accuracy in decision. In the present Example, the processing and the function of the NAM speech power calculating unit 18, threshold value calculating unit 23 and the decision unit 12 may be implemented by a program executed on the computer (CPU).

Figure 7:
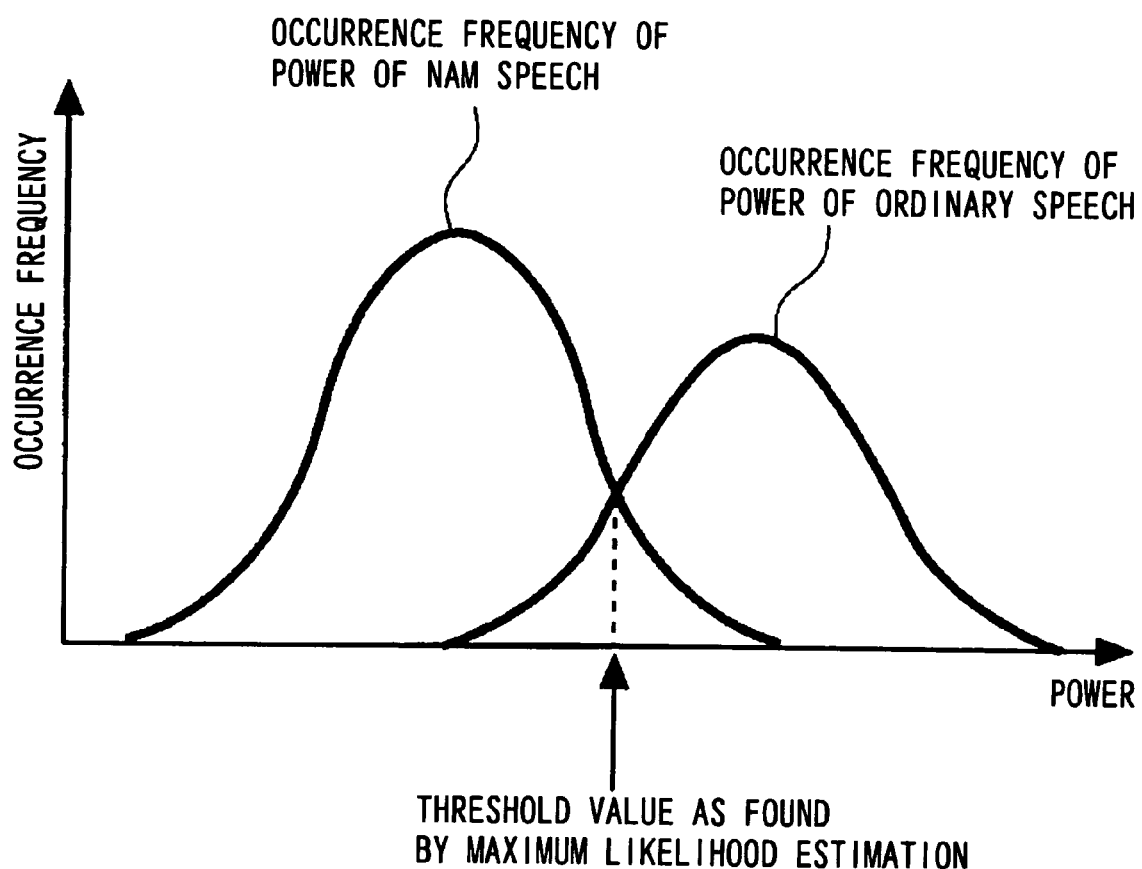
FIG. 7 is a graph for illustrating an Example 6 of the present invention.

An Example 6 of the present invention will now be described. In the present Example, which is a modification of the Example 5, the threshold value is calculated for a plurality of frames that have learned the power. The configuration of the present Example is the same as that of FIG. 6. FIG. 7 illustrates the Example 6 of the present invention. The NAM speech power holding unit 21 holds the values of the short-term rms power of the multiple frames Pn(1), Pn(2), . . . , P(n)(Nn) as long as the switch for NAM utterance learning 19 is on.

In the present Example, the ordinary speech power holding unit 22 holds the values of the short-term rms power of the multiple frames Pt(1), Pt(2), . . . , P(t)(Nt) as long as the switch for ordinary speech utterance learning 20 is on.

At a time point both the switch for NAM utterance learning 19 and the switch for ordinary speech utterance learning 20 are turned off, the threshold value calculating unit 23 calculates a threshold value for the sequence of {Pn(1), Pn(2), . . . , Pn(Nn)} and for the sequence of {Pt(1), Pt(2), . . . , Pt(Nt)} in accordance with a method of maximum likelihood estimation. That is, the threshold value, indicated by arrow in FIG. 7, is found in accordance with the method of maximum likelihood estimation with respect to the frequency of occurrence of the NAM speech power and that of the ordinary speech power. In FIG. 7, the occurrence frequency and the power are plotted on the ordinate and the abscissa, respectively. This configuration renders it possible to improve the accuracy of the threshold value which acts as the reference of decision in the decision unit 12B.

Figure 8:
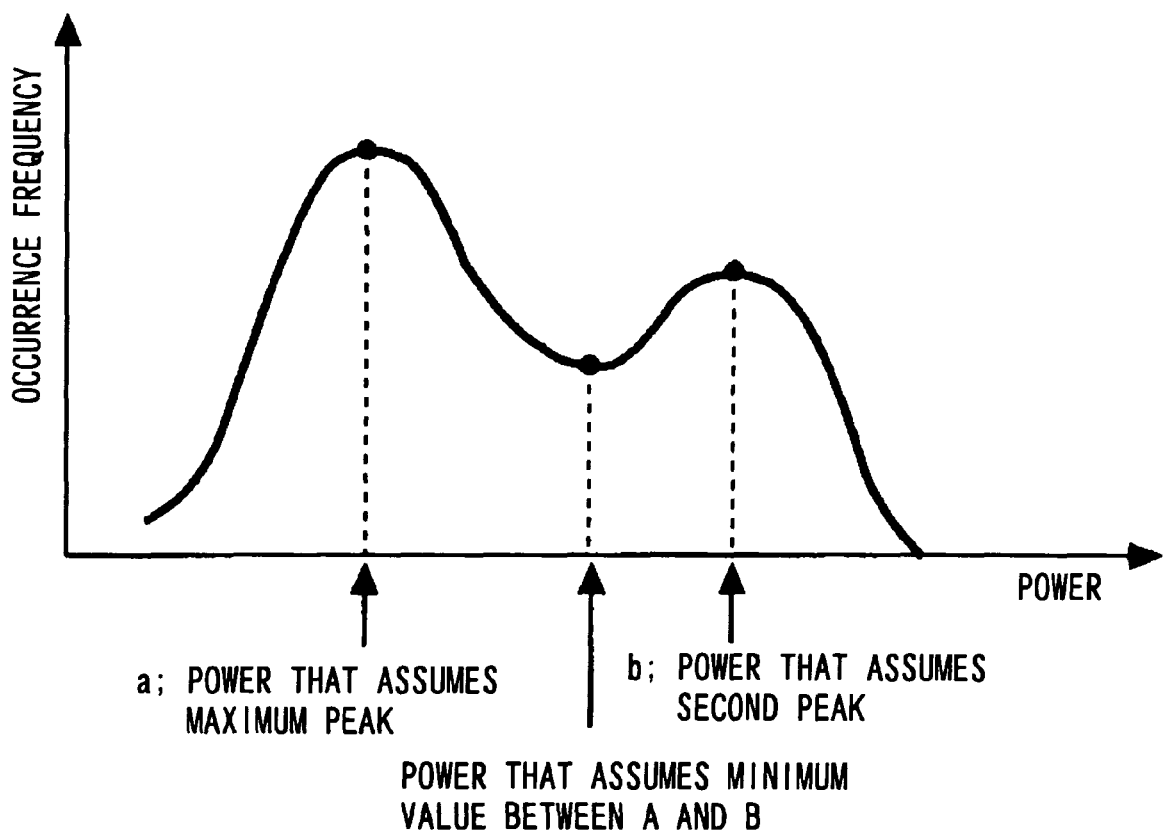
FIG. 8 is a graph for illustrating an Example 7 of the present invention.

An Example 7 of the present invention will now be described. In the present Example, learning is not made as the switch for NAM utterance learning 19 and the switch for ordinary speech utterance learning 20 are pressed down, as in the Example 5 described above. Instead, the threshold value for deciding the ordinary speech is sequentially learned during the time of use of the unvoiced speech receiving unit 11, such as NAM microphone. FIG. 8 is a graph for illustrating the Example 7 of the present invention. It is noted that the configuration of the present Example may correspond to that of FIG. 6 from which the switch for ordinary speech utterance learning 20 and the ordinary speech power holding unit 22 have been deleted.

The NAM speech power holding unit 21 holds the values of the short-term rms power P(1), P(2), . . . , P(N) of multiple frames as long as the switch for NAM utterance learning 19 is on.

The threshold value calculating unit 23 calculates the histogram (occurrence frequency) of the short-term rms power sequence P(1), P(2), . . . , P(N). It then calculates the value of the short-term rms power that assumes a minimum value between the maximum peak and the second peak of the occurrence frequency, as being a threshold value in the decision unit 12B (see FIG. 6).

In the present Example, the threshold value for ordinary speech decision is not set or learned beforehand, and may be learned during using the apparatus, thus improving convenience, operability or use efficiency.

Figure 9:
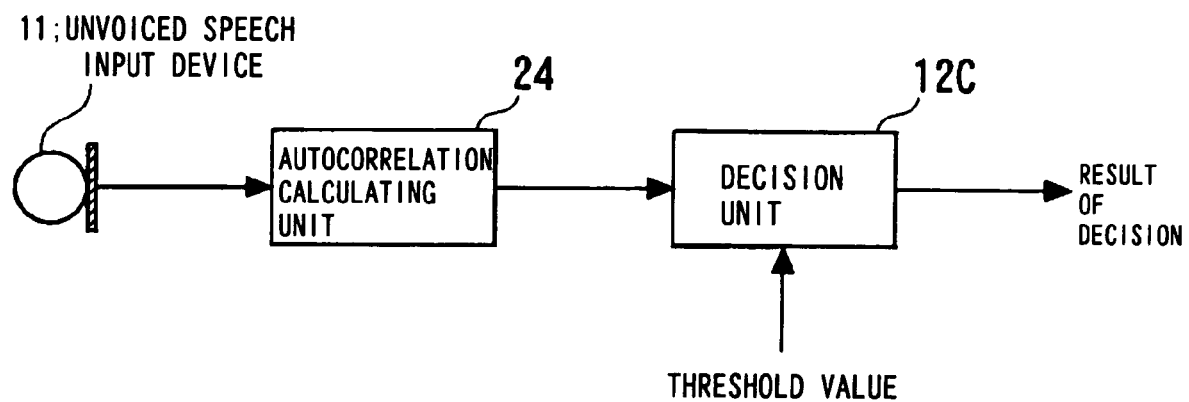
FIG. 9 is a block diagram showing the configuration of an Example 8 of the present invention.

An Example 8 of the present invention will now be described. FIG. 9 shows the configuration of the present Example. Referring to FIG. 9, the present Example detects the voiced property by an autocorrelation coefficient, and includes an unvoiced speech input device 11, an autocorrelation calculation unit 24 and a decision unit 12C.

In the present Example, the unvoiced speech input device 11 includes a NAM microphone and receives the speech. The autocorrelation calculation unit 24 calculates an autocorrelation coefficient of the speech delivered from the unvoiced speech input device 11. It is assumed at this time that the frame length for analysis is 200 msec;
there is no frame overlap; and
the autocorrelation function is calculated for a range from 3 msec to 20 msec.

That is, the autocorrelation function of the speech x(i), delivered from the unvoiced speech input device 11:

$$Rx(\tau) = (1/N) \Sigma^{N-1}_{i=0} [x(i+\tau) x(i)] \quad (2)$$

is found for each value of delay time τ from 3 msec to 20 msec, for instance. It is noted that resolution τ of delay time is arbitrary. N corresponds to, for example, the number of samples of one frame period.

In the present Example, the decision unit 12C finds, on the frame basis, the maximum value of the autocorrelation function as calculated by the autocorrelation calculation unit 24. For example, the decision unit finds the maximum value of the autocorrelation function from among multiple values of the autocorrelation function Rx(τ) with the delay time τ ranging between 3 msec and 20 msec. A range composed of three or more consecutive frames with the maximum values of the autocorrelation function not less than a preset threshold value indicates a high possibility of the range exhibiting the voiced property. Hence, this range is determined to be ordinary speech utterance.

With the present Example of the above configuration, the ordinary speech utterance may be detected even in case an ordinary speech utterance is made with a low power as often occurs at an end of a sentence.

Figure 10A:
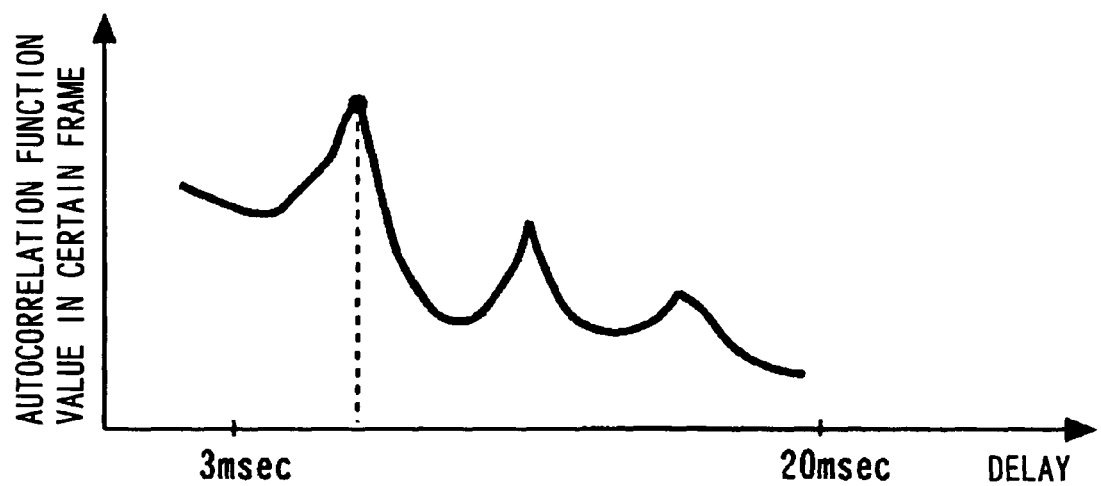
FIGS. 10A and 10B are a graph and a histogram for illustrating the Example 7 of the present invention, respectively.
Figure 10B:
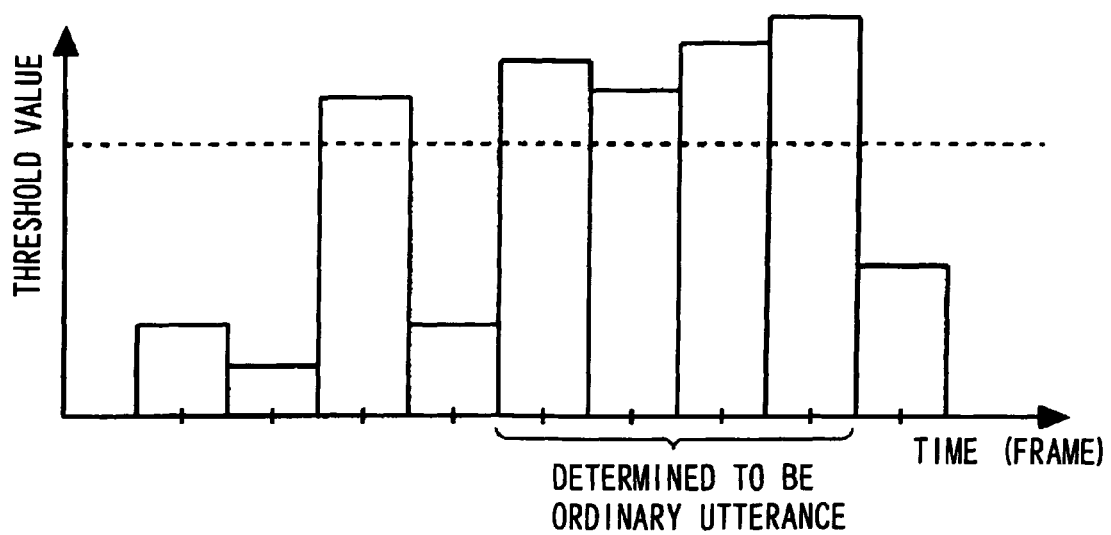

In FIG. 10A, showing an instance of the value of the autocorrelation function as found by the autocorrelation calculation unit 24, the horizontal axis and the vertical axis denote the delay (τ) and the value of the autocorrelation function, respectively. In FIG. 10B, showing time transition of the value of the autocorrelation function, each time division on the horizontal axis denotes a frame, and the vertical axis denotes the value of the autocorrelation function. Since the values of the autocorrelation function in FIG. 10B are higher than the threshold value for four consecutive frames, the utterance is determined to be the ordinary speech utterance. In the present Example, processing as well as the functions of the autocorrelation calculation unit 24 and the decision unit 12 may be implemented by a program executed on a computer (CPU).

Figure 11A:
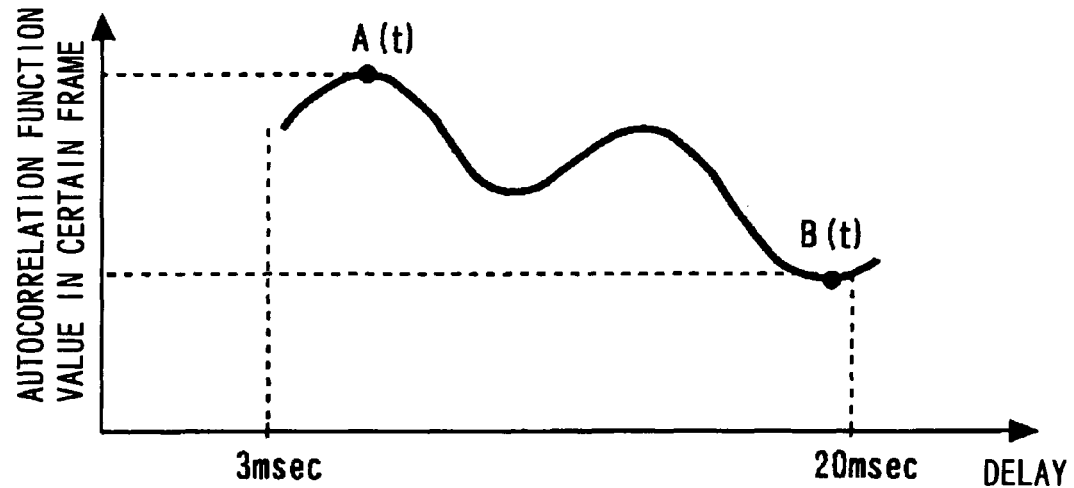
FIGS. 11A and 11B are a graph and a histogram for illustrating an Example 9 of the present invention, respectively.
Figure 11B:
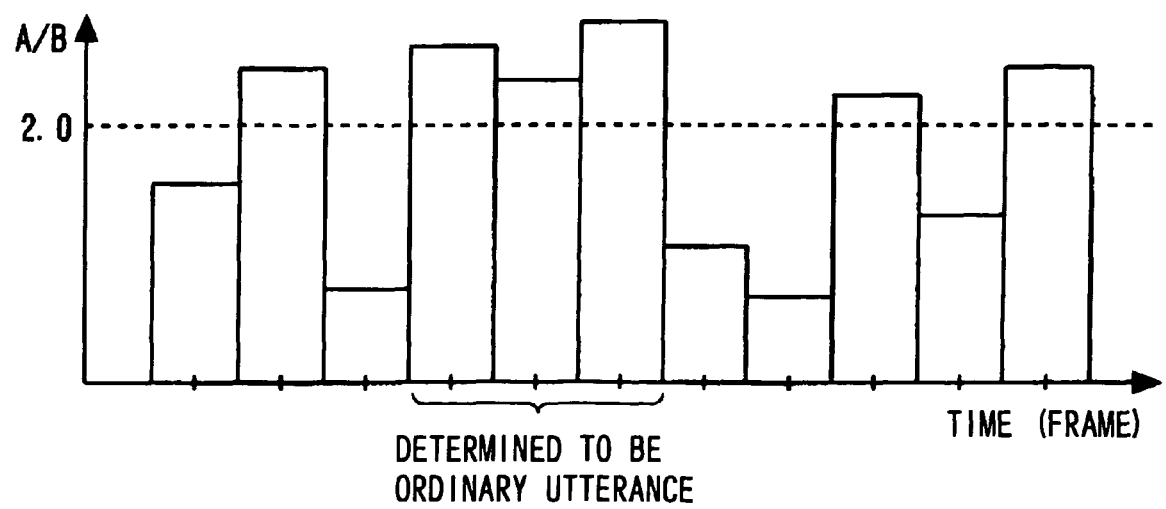

An Example 9 of the present invention will now be described. The configuration of the Example 9 is similar to that of the Example 8 described with respect to FIG. 9. FIGS. 11A and 11B illustrate a modification of the Example 9.

In the present Example, the decision unit 12 finds the maximum value A(t) and the minimum value B(t) of the values of the autocorrelation function, as found by the autocorrelation calculation unit 24, from frame to frame, and calculates the ratio h(t) thereof.

$$h(t) = A(t)/B(t) \quad (3)$$

In the present Example, if the ratio h(t) is not lower than the threshold value, such as 2.0, for three temporally consecutive frames, the corresponding interval is determined to be the ordinary speech utterance.

With the present Example, formulated as above, an ordinary speech utterance may be detected in stability even if ordinary speech utterance is made with low power as at the end of a sentence.

Figure 12:
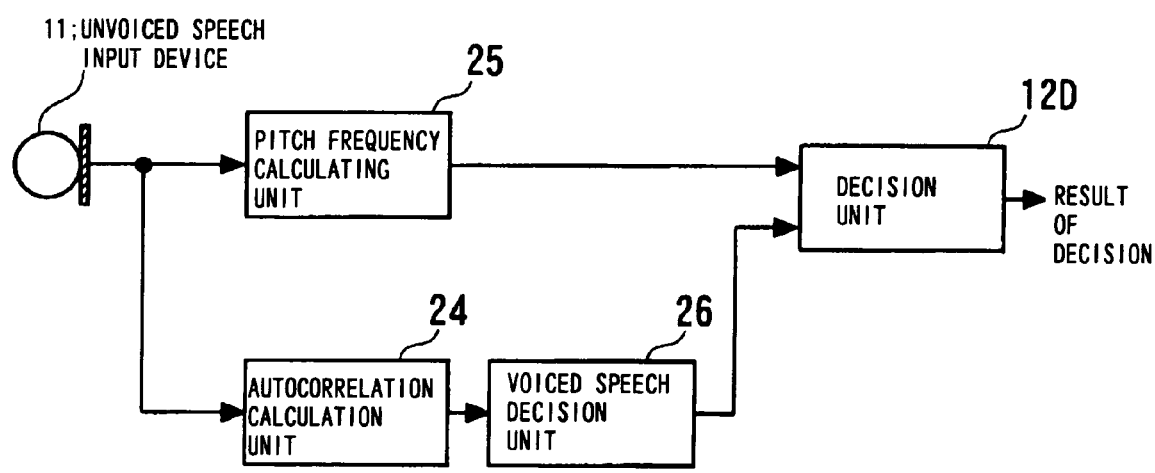
FIG. 12 is a block diagram showing the configuration of an Example 10 of the present invention.

An Example 10 of the present invention will now be described. FIG. 12 depicts the configuration of the Example 10 of the present invention. Referring to FIG. 12, the present Example includes an unvoiced speech input device 11, an autocorrelation calculation unit 24, a decision unit 12D, a pitch frequency calculating unit 25, and a voiced speech decision unit 26.

In the present Example, only one unvoiced speech input device 11 (NAM microphone) is provided, and decision is made using both the pitch frequency and the distinction between the voiced/unvoiced to decrease errors in decision. The pitch frequency calculating unit 25 calculates the pitch frequency of the input speech, using e.g. the modified correlation method (Non-Patent Document 2). It is assumed at this time that the frame length for analysis is 200 msec; and
there is no frame overlap.

The autocorrelation calculation unit 24 calculates the autocorrelation function for each frame of the same input speech.

The autocorrelation function is calculated for a range of the values of τ from 3 to 20 msec.

The voiced speech decision unit 26 finds the maximum value of the autocorrelation function, as found by the autocorrelation calculation unit 24, from each frame. If the maximum values of the autocorrelation calculation exceed a predetermined value for three or more consecutive frames, the corresponding interval is determined to be a voiced interval.

If an interval in question has been determined to be 'a voiced interval' by the voiced speech decision unit 26 and the pitch frequency of the interval in question ranges between 50 and 300 Hz, the decision unit 12D determines such interval to be an interval of 'ordinary speech utterance'.

With the present Example, configured as above, an ordinary speech utterance may be detected in stability, even if ordinary speech utterance is made with low power as at the end of a sentence.

In the present Example, processing as well as the functions of the autocorrelation calculation unit 24, the decision unit 12D, pitch frequency calculating unit 25 and the voiced speech decision unit 26 may be implemented by a program run on a computer (CPU).

Figure 13:
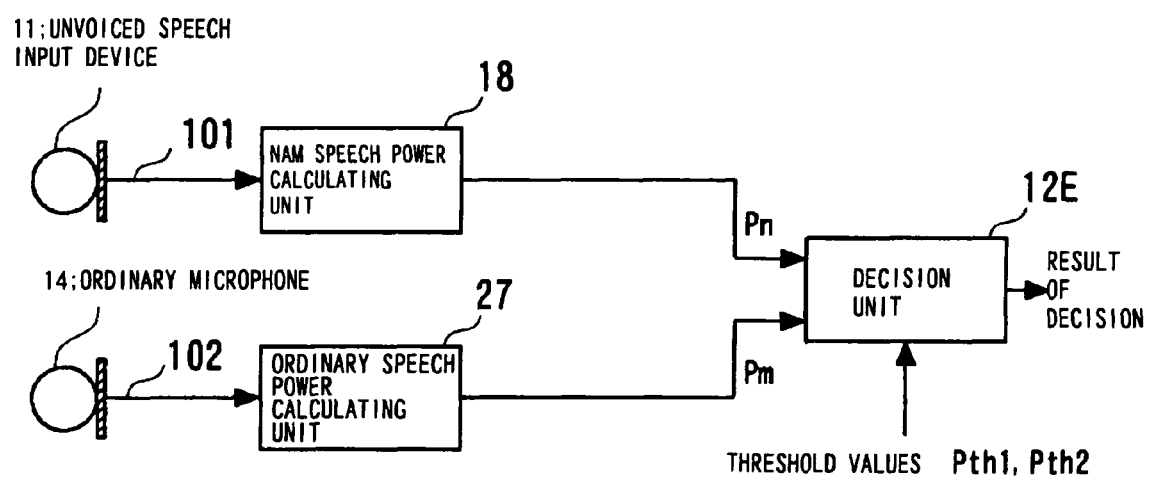
FIG. 13 is a block diagram showing the configuration of an Example 11 of the present invention.

An Example 11 of the present invention will now be described. FIG. 13 shows the configuration of the Example 11 of the present invention. Referring to FIG. 13, the present Example includes an unvoiced speech input device 11, a NAM speech power calculating unit 18, an ordinary microphone 14, an ordinary speech power calculating unit 27 and a decision unit 12E. The present Example uses two microphones, and exploits the power of the NAM microphone input speech and that of the ordinary microphone input speech. The unvoiced speech input device 11 (NAM microphone) and the ordinary microphone 14 receive the speech. The NAM microphone is stuck and fixed to the body surface, such as in the vicinity of an ear, whilst the ordinary microphone 14 is arranged in the vicinity of a mouth.

The NAM speech power calculating unit 18 calculates the short-term rms power Pn of the speech delivered from the NAM microphone 11. The ordinary speech power calculating unit 27 calculates the short-term rms power Pm of the speech input from the ordinary microphone 14.

It is assumed at this time that the frame length is 200 msec; and there is no frame overlap.

A Hanning window is applied to the frame in question to calculate the rms power.

Using the powers Pn, Pm, and two preset threshold values Pth1 and Pth2, the decision unit 12E gives decisions under the conditions shown for example in FIG. 14:

if (Pth1<Pn) and (Pth2<Pm), then, ordinary speech;

if (Pth1≧Pn) and (Pth2<Pm), then, an external noise;

if (Pth1<Pn) and (Pth2≧Pm), then, NAM or unvoiced speech; and if (Pth1≧Pn) and (Pth2≧Pm), then, no sound.

It is a thus determined that the signal is the ordinary speech utterance, only when (Pth1<Pn) and (Pth2<Pm). This renders it possible to exclude an external noise emanating from a sound source other than the wearer to detect the ordinary speech utterance in stability.

In the present Example, the processing as well as the functions of the NAM speech power calculating unit 18, ordinary speech power calculating unit 27 and the decision unit 12E may be implemented by a program run on a computer (CPU).

Figure 15:
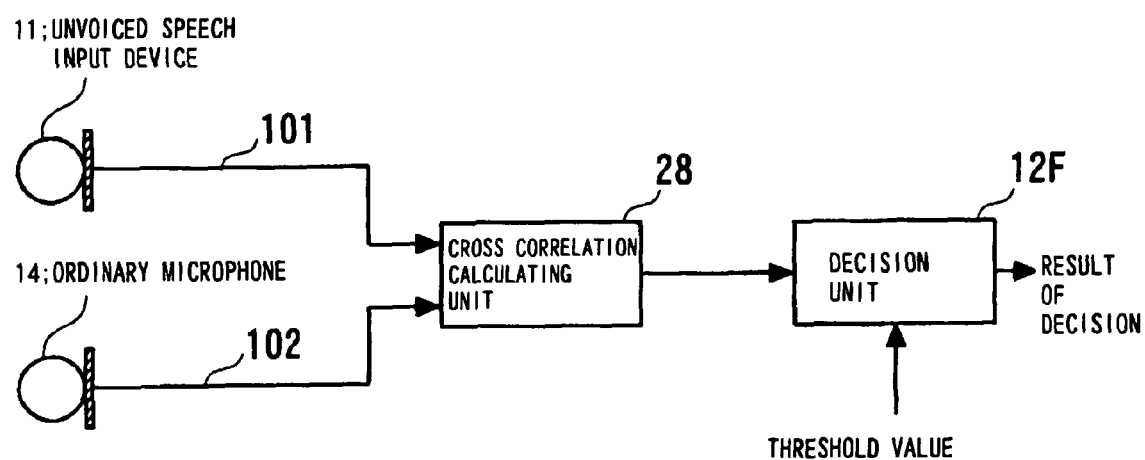
FIG. 15 is a block diagram showing the configuration of an Example 12 of the present invention.

An Example 12 of the present invention will now be described. FIG. 15 shows the configuration of the Example 12 of the present invention. Referring to FIG. 15, the present Example includes an unvoiced speech input device 11 (NAM microphone), an ordinary microphone 14, a cross correlation calculating unit 28 and a decision unit 12F. The present Example is of a two-microphone configuration and gives a decision based on the high correlation between the speech received by the NAM microphone and the speech received by the ordinary microphone. The unvoiced speech input device 11 and the ordinary microphone 14 receive the speech.

The cross correlation calculating unit 28 calculates a cross correlation coefficient of the NAM speech waveform input from the unvoiced speech input device 11, and the waveform of the ordinary speech input from the ordinary microphone 14. It is assumed at this time that the frame length is 200 msec; and there is no frame overlap.

The cross correlation function of the NAM speech x(i) and the ordinary speech y(i):

$$Rxy(\tau)=(1/N)\Sigma^{N-1}_{i=0}[x(i+\tau)y(i)] \quad (4)$$

is found for each value of delay time τ from 3 msec to 20 msec, for instance. It is noted that resolution τ of delay time is arbitrary. N corresponds to, for example, the number of samples of one frame period.

When the value of the cross correlation function Rxy(τ) is greater than a preset threshold value, the decision unit 12F decides that an ordinary speech has been input. At this time, the maximum value of the cross correlation function Rxy(τ) is compared to a preset threshold value.

With the present Example, in which the cross correlation coefficient of the ordinary speech and the NAM speech is found, it is possible to exclude the interference from a sound source other than the wearer to allow detection of the ordinary speech utterance in stability.

In the present Example, the processing as well as the functions of the cross correlation calculating unit 28 and the decision unit 12F may be implemented by a program run on a computer (CPU).

Figure 16:
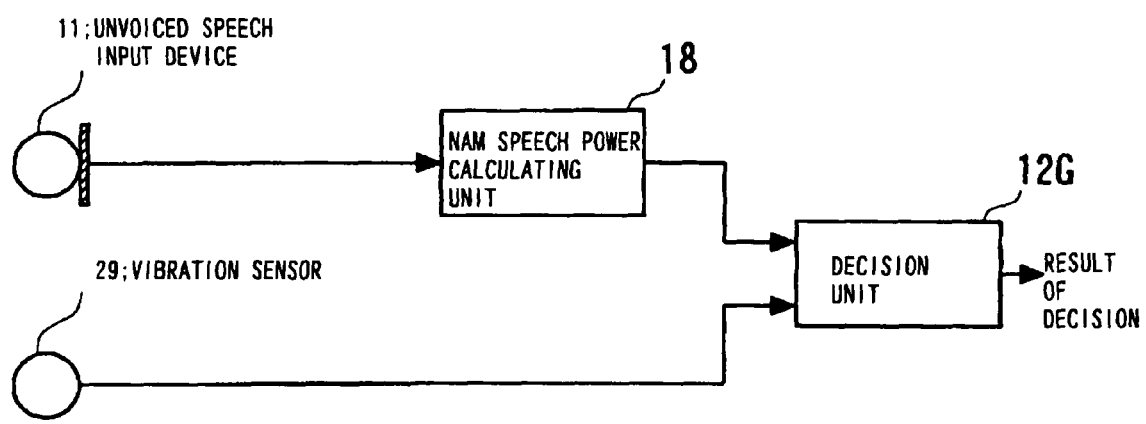
FIG. 16 is a block diagram showing the configuration of an Example 13 of the present invention.

An Example 13 of the present invention will now be described. FIG. 16 shows the configuration of an Example 13 of the present invention. Referring to FIG. 16, the present Example includes an unvoiced speech input device (NAM microphone) 11, a NAM speech power calculating unit 18, a vibration sensor 29 and a decision unit 12G.

In the present Example, the vibration sensor 29 is a contact type product (off-the shelf product, such a piezo sensor), and is secured to the body surface or apparel of the wearer of the unvoiced speech input device 11 (NAM microphone). In case a sensor output signal, supplied from the vibration sensor 29 to the decision unit 12G, indicates "there is vibration", the decision unit 12G refrains from giving a decision for the ordinary speech. An acceleration sensor may be used in place of the vibration sensor 29. With the use of the acceleration sensor, the vibration transmitted through the body or the wearer's body movement may be picked up by the NAM microphone to render it possible to prevent the vibration or the wearer's body movement from being mis-determined to be the ordinary speech.

The present Example corresponds to the Example 4 of FIG. 5 added by the vibration sensor 29 (acceleration sensor). This configuration may similarly be applied to the above-described Examples 6 to 12 as well. That is, the output of the vibration sensor 29 (acceleration sensor) is supplied to each of the decision units of the respective Examples. If, in this case, the vibration sensor indicates 'there is vibration', the decision unit exercises control to refrain from giving a decision that the incoming speech is the ordinary speech.

In the present Example, the processing as well as the functions of the NAM speech power calculating unit 18 and the decision unit 12G may be implemented by a program run on a computer (CPU).

With the above respective Examples, it becomes possible for the user to continue his/her unvoiced speech easily in stability. Hence, the speech may be delivered as input under a situation or use in which it is and has been not possible to deliver speech. For example, the present invention may be applied to a telephone transmitter or for a speech recognition input port of a computer.

Although the present invention has been described with reference to the particular illustrative Examples, it is not restricted by these embodiments and may be changed or modified by those skilled in the art without departing from the scope and the spirit of the present invention.

Further, variegated changes or adjustments of the Examples or the exemplary embodiments disclosed herein may be made within the framework of the total disclosure inclusive of the claims based on the basic technical concept of the invention. That is, the present invention may encompass various combinations or selections of the elements disclosed herein within the scope of the claims.

The invention claimed is:

1. An apparatus for giving an alarm in connection with inputting unvoiced speech, the apparatus comprising:
    an input unit including an unvoiced speech input device that receives an unvoiced speech, and an ordinary speech input device that receives an ordinary speech;
    a decision unit that determines whether or not a signal received from the unvoiced speech input device is an ordinary speech, using a signal received from the unvoiced speech input device and a signal received from the ordinary speech input device; and,
    an alarm unit that outputs an alarm, when a result of the decision made by the decision unit indicates that an ordinary speech is input, wherein
    the decision unit determines whether or not the signal received from the unvoiced speech input device is an ordinary speech, based on a power of the signal received from the unvoiced speech input device and a power of the signal received from the ordinary speech input device,
    the decision unit determines whether or not the signal received from the unvoiced speech input device is an ordinary speech, based on a value of an autocorrelation function of the signal received from the unvoiced speech input device, in case the power of the signal received from the unvoiced speech input device and the power of the signal received from the ordinary speech input device are respectively greater than or equal to preset first and second threshold values,
    the decision unit determines whether or not the signal received from the unvoiced speech input device is an ordinary speech, based on a value of a cross correlation function between the signal received from the unvoiced speech input device and the signal received from the ordinary speech input device, in case the value of the autocorrelation function of the signal received from the unvoiced speech input device is greater than or equal to a preset third threshold value, and
    the decision unit determines that the signal received from the unvoiced speech input device is an ordinary speech, in case the value of the cross correlation function between the signal received from the unvoiced speech input device and the signal received from the ordinary speech input device is greater than or equal to a preset fourth threshold value.

2. The apparatus according to claim 1, wherein the decision unit determines that the signal received from the unvoiced speech input device is an ordinary speech, in case a maximum value of the cross correlation function between the signal received from the unvoiced speech input device and the signal received from the ordinary speech input device is greater than the preset fourth threshold value, or, in case a pitch frequency of the signal received from the unvoiced speech input device is coincident with the pitch frequency of the input signal received from the ordinary speech input device.

3. The apparatus according to claim 1, wherein the decision unit determines the signal received from the unvoiced speech input device to be other than the ordinary speech, in case the power of the signal received from the unvoiced speech input device is less than the preset first threshold value; wherein
    in case the power of the signal received from the unvoiced speech input device is greater than or equal to the preset first threshold value,
    if the power of the signal received from the ordinary speech input device is less than the preset second threshold value, the decision unit determines the signal received from the unvoiced speech input device to be other than the ordinary speech;
    if the power of the signal received from the ordinary speech input device is greater than or equal to the preset second threshold value, the decision unit calculates a maximum value of the autocorrelation function of the signal received from the unvoiced speech input device and determines the signal received from the unvoiced speech input device to be other than the ordinary speech, if the maximum value of the autocorrelation function is less than the preset third threshold value;
    if the maximum value of the autocorrelation function is greater than or equal to the preset third threshold value, the decision unit finds a maximum value of a cross correlation function between the signal received from the unvoiced speech input device and the signal received from the ordinary speech input device and determines the signal received from the unvoiced speech input device to be the ordinary speech, if the maximum value of the cross correlation function is greater than or equal to the preset fourth threshold value; and
    the decision unit determines the signal received from the unvoiced speech input device to be other than the ordinary speech, if the maximum value of the cross correlation function is less than the preset fourth threshold value.

4. The apparatus according to claim 1, further comprising:
    a speech converter that receives a signal received from the unvoiced speech input device to convert the signal into an ordinary speech which is output; and
    an output device that outputs the ordinary speech converted by the speech converter;
    the signal received from the unvoiced speech input device being converted by the speech converter to the ordinary speech and fed back to a wearer via the output device;
    the alarm unit giving an alarm via the output device to the wearer, when the signal received from the unvoiced speech input device is determined to be an ordinary speech.

5. The apparatus according to claim 4, comprising
a suppressing unit arranged between the speech converter and the output device, the suppressing unit suppressing feedback of the ordinary speech from the speech converter to the wearer;
the feedback of the ordinary speech from the speech converter to the output device being suppressed when the alarm unit gives an alarm to the output device.

6. The apparatus according to claim 1, further comprising:
a first power calculating unit that calculates the power of the signal received from the unvoiced speech input device; and
a second power calculating unit that calculates the power of the signal received from the ordinary speech input device;
the decision unit receiving outputs of the first and second power calculating units and determining whether or not the signal received from the unvoiced speech input device is the ordinary speech based on outputs of the first and second power calculating units and the preset first and second threshold values.

7. The apparatus according to claim 1, further comprising
a cross correlation calculating unit that calculates a cross correlation function between the signal received from the unvoiced speech input device and the signal received from the ordinary speech input device,
the decision unit determining whether or not the signal is the ordinary speech based on an output value of the cross correlation calculating unit and the preset fourth threshold value.

8. The apparatus according to claim 1, further comprising
a sensor that detects vibration or acceleration, an output of the sensor being supplied to the decision unit,
the decision unit exercising control so as not to make a decision for an ordinary speech, in case the sensor has detected the vibration or acceleration.

9. A method for receiving an unvoiced speech, the method comprising:
receiving a signal from an unvoiced speech input device that receives an unvoiced speech;
receiving a signal from an ordinary speech input device that receives an ordinary speech;
determining whether or not the signal received from the unvoiced speech input device is an ordinary speech, using the signal received from the unvoiced speech input device and the signal received from the ordinary speech input device; and
outputting an alarm, when it is determined that an ordinary speech is input, wherein
in determining that an ordinary speech is input, the method comprises:
determining whether or not the signal received from the unvoiced speech input device is an ordinary speech, based on a power of the signal received from the unvoiced speech input device and a power of the signal received from the ordinary speech input device,
determining whether or not the signal received from the unvoiced speech input device is an ordinary speech, based on a value of an autocorrelation function of the signal received from the unvoiced speech input device, in case the power of the signal received from the unvoiced speech input device and the power of the signal received from the ordinary speech input device are respectively greater than or equal to preset first and second threshold values,
determining whether or not the signal received from the unvoiced speech input device is an ordinary speech, based on a value of a cross correlation function between the signal received from the unvoiced speech input device and the signal received from the ordinary speech input device, in case the value of the autocorrelation function of the signal received from the unvoiced speech input device is greater than or equal to a preset third threshold value, and
determining that the signal received from the unvoiced speech input device is an ordinary speech, in case the value of the cross correlation function between the signal received from the unvoiced speech input device and the signal received from the ordinary speech input device is greater than or equal to a preset fourth threshold value.

10. A non-transitory computer readable medium comprising instructions that causes a computer composing an unvoiced speech receiving apparatus to execute the processing of:
receiving a signal from an unvoiced speech input device and a signal from an ordinary speech input device;
determining, using the signal received from the unvoiced speech input device and the signal received from the ordinary speech input device, whether or not the signal received from the unvoiced speech input device is an ordinary speech; and
outputting an alarm, when it is determined that an ordinary speech is input, wherein
the processing of determining that an ordinary speech is input comprises:
determining whether or not the signal received from the unvoiced speech input device is an ordinary speech, based on a power of the signal received from the unvoiced speech input device and a power of the signal received from the ordinary speech input device,
determining whether or not the signal received from the unvoiced speech input device is an ordinary speech, based on a value of an autocorrelation function of the signal received from the unvoiced speech input device, in case the power of the signal received from the unvoiced speech input device and the power of the signal received from the ordinary speech input device are respectively greater than or equal to preset first and second threshold values,
determining whether or not the signal received from the unvoiced speech input device is an ordinary speech, based on a value of a cross correlation function between the signal received from the unvoiced speech input device and the signal received from the ordinary speech input device, in case the value of the autocorrelation function of the signal received from the unvoiced speech input device is greater than or equal to a preset third threshold value, and
determining that the signal received from the unvoiced speech input device is an ordinary speech, in case the value of the cross correlation function between the signal received from the unvoiced speech input device and the signal received from the ordinary speech input device is greater than or equal to a preset fourth threshold value.

* * * * *